(12) United States Patent
Saito

(10) Patent No.: US 11,758,050 B2
(45) Date of Patent: Sep. 12, 2023

(54) CONFERENCE SYSTEM, CONFERENCE METHOD, AND RECORDING MEDIUM CONTAINING CONFERENCE PROGRAM

(71) Applicant: SHARP KABUSHIKI KAISHA, Sakai (JP)

(72) Inventor: Kensuke Saito, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/750,801

(22) Filed: May 23, 2022

(65) Prior Publication Data
US 2022/0385765 A1 Dec. 1, 2022

(30) Foreign Application Priority Data

May 27, 2021 (JP) .................. 2021-089301

(51) Int. Cl.
| | | |
|---|---|---|
| H04M 3/00 | (2006.01) | |
| H04M 5/00 | (2006.01) | |
| H04L 12/66 | (2006.01) | |
| H04M 3/56 | (2006.01) | |
| G10L 17/02 | (2013.01) | |

(52) U.S. Cl.
CPC ............. *H04M 3/568* (2013.01); *G10L 17/02* (2013.01); *H04M 3/566* (2013.01)

(58) Field of Classification Search
CPC ............... H04L 65/403; H04L 65/1069; H04L 65/4061; H04L 12/1822; H04L 12/1827; H04L 65/1089; H04L 65/1104; H04L 51/10; H04L 65/4038; H04L 65/1101; H04L 65/1083; H04M 1/72403; H04M 2201/40; H04M 2207/185; H04M 3/568; H04M 3/567; H04M 3/562; H04M 2203/5072; H04M 3/569; G06F 3/165; G06F 16/487; G06F 16/787
USPC .......... 379/202.01, 88.01, 88.02, 158, 93.21; 370/352, 260
See application file for complete search history.

(56) References Cited

U.S. PATENT DOCUMENTS

| | | | | |
|---|---|---|---|---|
| 11,563,855 | B1* | 1/2023 | Spivak | H04L 67/306 |
| 2010/0260074 | A1* | 10/2010 | Blouin | H04L 65/403 |
| | | | | 379/202.01 |
| 2012/0249328 | A1* | 10/2012 | Xiong | G08B 21/22 |
| | | | | 340/541 |
| 2013/0250035 | A1* | 9/2013 | Murali | H04M 3/56 |
| | | | | 379/202.01 |
| 2016/0295539 | A1* | 10/2016 | Atti | H04L 43/087 |
| 2018/0176265 | A1* | 6/2018 | Le Rouzic | H04L 65/80 |
| 2022/0107779 | A1* | 4/2022 | Abhishek | G06F 3/165 |
| 2022/0303502 | A1* | 9/2022 | Fisher | G06F 3/165 |

FOREIGN PATENT DOCUMENTS

JP H10-136100 A 5/1998

* cited by examiner

*Primary Examiner* — Kharye Pope
(74) *Attorney, Agent, or Firm* — ScienBiziP, P.C.

(57) ABSTRACT

A conference system includes a conversation state determiner that determines whether or not the state of first and second users is a direct conversation state in which direct conversation is possible without using a speech system, and an output controller that controls whether or not to cause the speech system to output a first acquired voice from a second speaker, based on the determination result of the conversation state determiner.

14 Claims, 9 Drawing Sheets

| CONFERENCE ROOM INFORMATION ||
|---|---|
| CONFERENCE ROOM ID | CONFERENCE ROOM NAME |
| R001 | R1 |
| R002 | R2 |
| ... | ... |

| USER INFORMATION |||
|---|---|---|
| USER ID | USER NAME | PASSWORD |
| U001 | A | ****** |
| U002 | B | ****** |
| U003 | C | ****** |
| U004 | D | ****** |
| ... | ... | ... |

| CONFERENCE INFORMATION ||||||||
| MEETING ID | CONFERENCE NAME | CONFERENCE ROOM ID | STARTING DATE AND TIME | ENDING DATE AND TIME | PARTICIPANT ID (USER ID) | FILE ID |
|---|---|---|---|---|---|---|
| M001 | M1 | R001,R002 | 11:30 | 12:00 | U001,U002, U003,U004 | F001 |
| M002 | M2 | R001 | 13:00 | 15:00 | ... | F002 |
| ... | ... | ... | ... | ... | ... | ... |

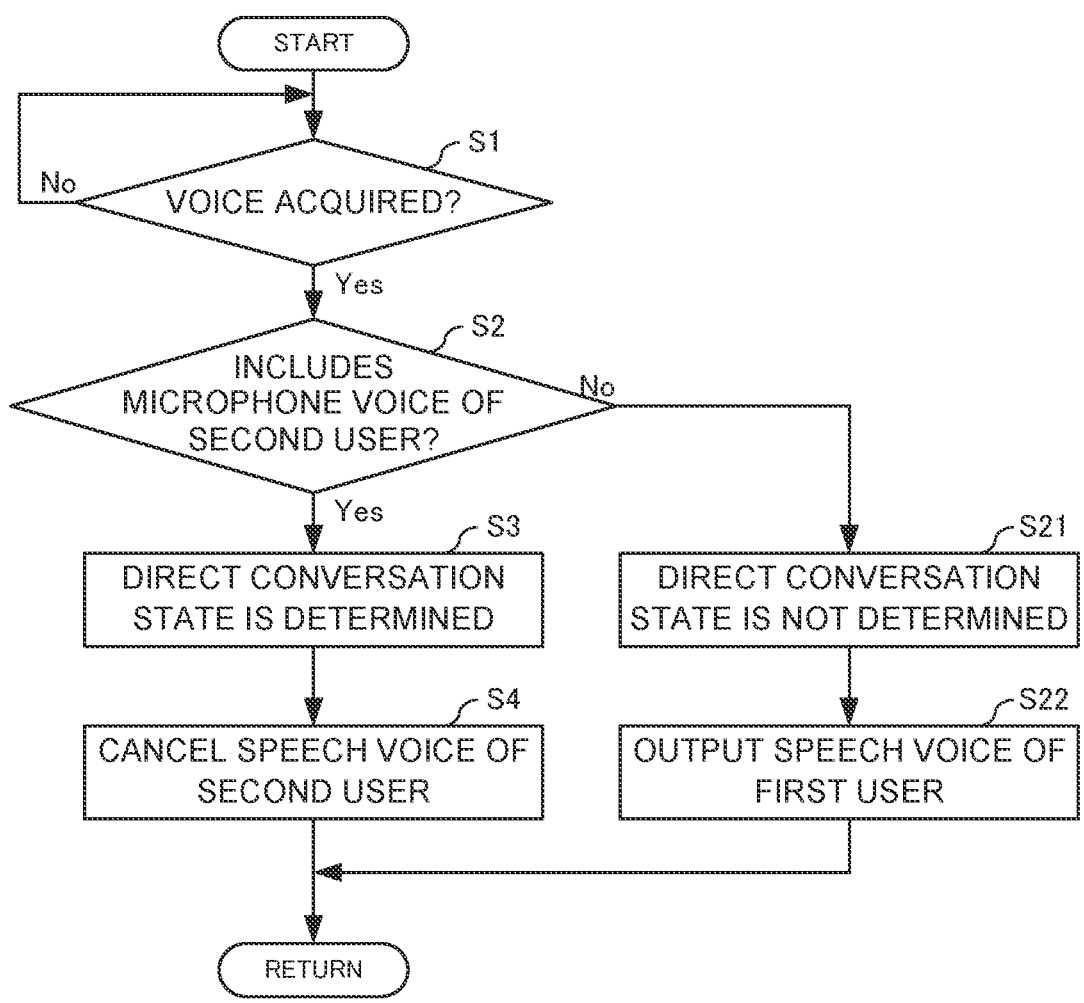

CONFERENCE SYSTEM, CONFERENCE METHOD, AND RECORDING MEDIUM CONTAINING CONFERENCE PROGRAM

INCORPORATION BY REFERENCE

This application is based upon and claims the benefit of priority from the corresponding Japanese Patent Application No. 2021-089301 filed on May 27, 2021, the entire contents of which are incorporated herein by reference.

BACKGROUND

The disclosure relates to a conference system, a conference method, and a recording medium containing a conference program.

Conventionally, there are known conference systems that enable multiple users (conference participants) to hold conferences at multiple locations. For example, there are known conference systems in which wireless devices disposed at various sites are connected to a network to conduct conferences by sending and receiving voice data between the sites.

In recent years, users may participate in conferences while carrying their own personal computers (PCs) (user terminals). In such a conference, the following problems may arise. For example, among users A and B who are at the same location (conference room), when the user A speaks, the user B can directly hear what the user A says (speech voice). The user B's user terminal can use a conferencing application to output the user A's speech voice collected by a microphone of the user A's user terminal from a speaker of the user B's terminal. In such a case, the user B will have a problem of hearing the same voice twice, once directly from the user A and once from the user terminal.

SUMMARY

An object of the disclosure is to provide a conference system, a conference method, and a recording medium on which a conference program is recorded that allow a speech voice of a user to be appropriately heard.

The conference system according to an aspect of the disclosure is a conference system in which microphones and speakers are allocated to a plurality of users including a first user and a second user, and the users conduct a conference by using the microphones and the speakers allocated to the users, the conference system including: a speech system in which a first microphone allocated to the first user acquires a first acquired voice and outputs the first acquired voice from a second speaker allocated to the second user, and a second microphone allocated to the second user acquires a second acquired voice and outputs the second acquired voice from a first speaker allocated to the first user; a conversation state determiner that determines whether or not a state of the first user and the second user is a direct conversation state in which direct conversation is possible without using the speech system; and an output controller that controls whether or not to cause the speech system to output the first acquired voice from the second speaker, based on a result of the determination of the conversation state determiner.

A conference method according to another aspect of the disclosure is a conference method for conducting a conference by allocating microphones and speakers to a plurality of users including a first user and a second user and by allowing the users to use the allocated microphones and speakers, the conference method including: one or more processors executing: a speech system in which a first microphone allocated to the first user acquires a first acquired voice and outputs the first acquired voice from a second speaker allocated to the second user, and a second microphone allocated to the second user acquires a second acquired voice and outputs the second acquired voice from a first speaker allocated to the first user; a conversation state determiner that determines whether or not a state of the first user and the second user is a direct conversation state in which direct conversation is possible without using the speech system; and an output controller that controls whether or not to cause the speech system to output the first acquired voice from the second speaker, based on a result of the determination of the conversation state determiner.

A recording medium according to other aspects of the disclosure that records a conference program for conducting a conference by allocating microphones and speakers to a plurality of users including a first user and a second user and by allowing the users to use the allocated microphones and speakers, the conference program causing one or more processors to execute: acquiring a first acquired voice by a first microphone allocated to the first user and outputting the first acquired voice from a second speaker allocated to the second user, and acquiring a second acquired voice by a second microphone allocated to the second user and outputting the second acquired voice from a first speaker allocated to the first user; determining whether or not a state of the first user and the second user is a direct conversation state in which direct conversation is possible; and controlling whether or not to cause the speech system to output the first acquired voice from the second speaker, based on a result of the determination of the determining step.

According to the disclosure, provide are a conference system, a conference method, and a recording medium on which a conference program is recorded that allow a speech voice of a user to be appropriately heard.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a table illustrating an example of conference room information used in the conference system according to an embodiment of the disclosure.

FIG. 4 is a table illustrating an example of user information used in the conference system according to an embodiment of the disclosure.

FIG. 5 is a table illustrating an example of conference information used by the conference system according to an embodiment of the disclosure.

FIG. 10 is a flowchart illustrating an example of a procedure of the conference process executed in the conference system according to an embodiment of the disclosure.

DETAILED DESCRIPTION

Embodiments of the disclosure will now be described with reference to the accompanying drawings. The following embodiments are merely examples that embody the disclosure, and do not intend to limit the technical scope of the disclosure.

A conference system according to the disclosure is applicable to, for example, a conference participated by one or more users at different locations (conference rooms). For example, in the conference system according to the present embodiment, a user terminal used by each user participating in the conference and a display device for displaying various types of information such as a display screen of the user terminal are disposed in each conference room. Each user terminal is equipped with a microphone and speaker.

Conference System 100

Figure 1:
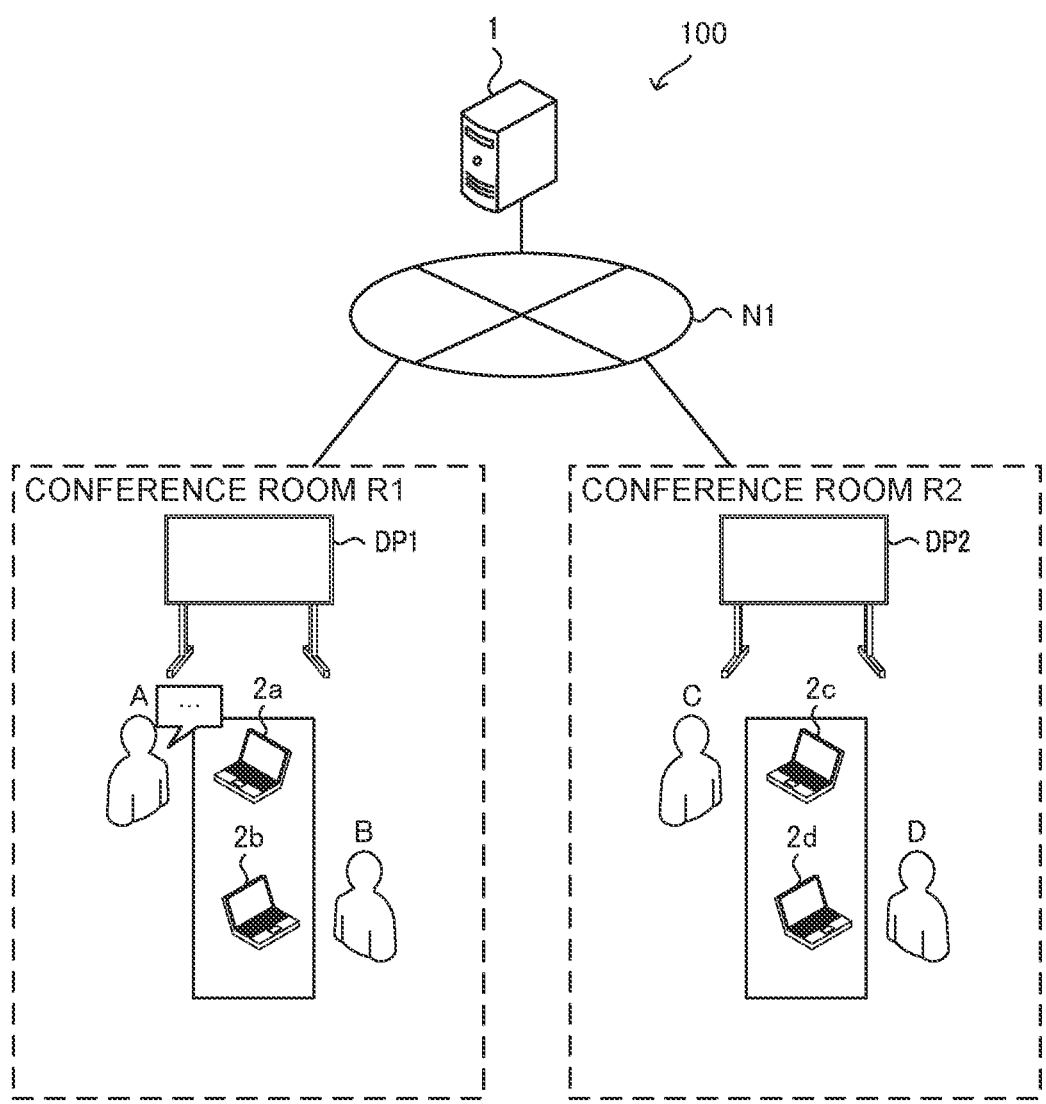
FIG. 1 is a schematic diagram illustrating a schematic configuration of a conference system according to an embodiment of the disclosure.

FIG. 1 is a diagram illustrating a schematic configuration of a conference system according to an embodiment of the disclosure. A conference system 100 includes a conference server 1, a user terminal 2, and a display device DP. For example, as illustrated in FIG. 1, a user terminal 2a used by a user A, who is a participant in the conference, and a user terminal 2b used by a user B, who is a participant in the conference, and a display unit DP1 are disposed in a conference room R1, and a user terminal 2c used by a user C, who a participant in the conference, a user terminal 2d used by a user D, who is a participant in the conference, and a display unit DP2 are disposed in a conference room R2.

The conference system 100 is a system in which microphones and speakers are allocated to multiple users including a first user and a second user, and the users conduct a conference by using the microphones and speakers allocated to themselves. For example, the user A is allocated to the microphone and speaker of the user terminal 2a, and the user B is allocated to the microphone and speaker of the user terminal 2b.

The conference system 100 includes a speech system in which a first microphone allocated to the first user acquires a first acquired voice and outputs the first acquired voice from a second speaker allocated to the second user, and a second microphone allocated to the second user acquires a second acquired voice and outputs the second acquired voice from a first speaker allocated to the first user. For example, the conference system 100 outputs a speech voice of the user A acquired by the microphone of the user terminal 2a allocated to the user A from the speaker of the user terminal 2c allocated to the user C, and outputs the speech voice of the user C acquired by the microphone of the user terminal 2c allocated to the user C from the speaker of the user terminal 2a allocated to the user A.

Conference Server 1

Figure 2:
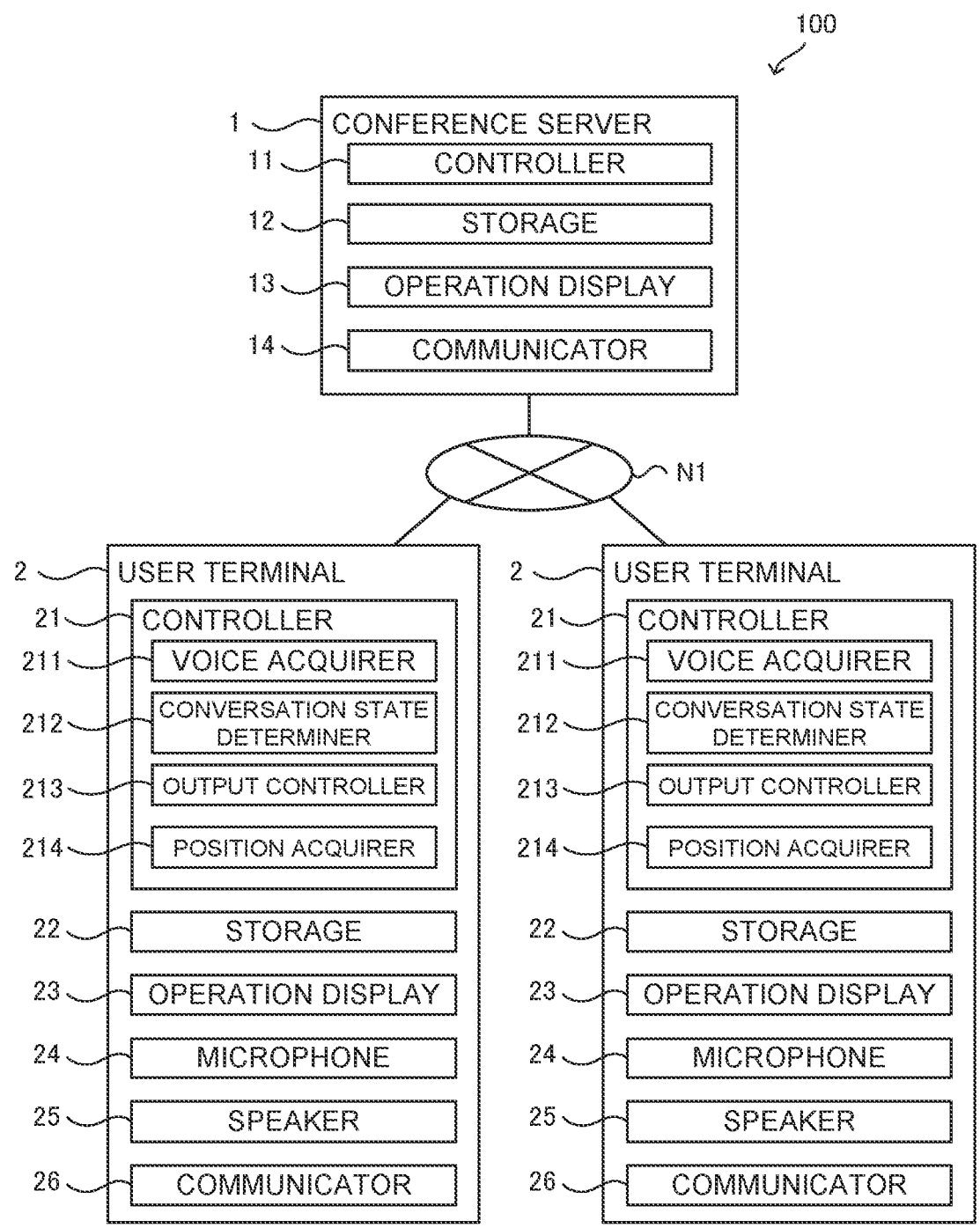
FIG. 2 is a functional block diagram illustrating a configuration of a conference system according to the embodiment of the disclosure.

As illustrated in FIG. 2, the conference server 1 includes a controller 11, a storage 12, an operation display 13, and a communicator 14. The conference server 1 may be one or more virtual servers (cloud servers) or one or more physical servers.

The communicator 14 is a communication interface for connecting the conference server 1 to a network N1 by wire or radio and for executing data communications in accordance with a predetermined communication protocol with other devices (e.g., the user terminal 2, the display device DP) via the network N1.

The operation display 13 is a user interface that includes a display, such as a liquid-crystal display or an organic EL display, that shows the various types of the information, and an operation acceptor, such as a mouse, a keyboard, or a touch panel, that accepts an operation.

The storage 12 is a non-volatile storage such as a flash memory, a hard disk drive (HDD) and a solid state drive (SSD) that store various types of information. The storage 12 stores a control program such as a conference program for causing the controller 11 to execute the conference process (see FIG. 10) described below. For example, the conference program is non-temporarily recorded on a computer-readable recording medium such as a CD or DVD, and may be read by a reading device (not illustrated) such as a CD drive or a DVD drive included in the conference server 1, so as to be stored in the storage 12.

In the storage 12, data such as conference room information D1, user information D2, and conference information D3 is stored.

FIG. 3 illustrates an example of the conference room information D1. The conference room information D1 includes information items such as corresponding "conference room ID" and "conference room name" that are registered, in association with each other and each conference room. The "conference room ID" is identification information of a conference room. The "conference room name" is the name of the conference room, and the room number, etc. are registered.

FIG. 4 illustrates an example of the user information D2. The user information D2 includes information items such as the corresponding "user ID," "user name," "password," etc. that are registered in association with each other and each user. The user information D2 includes information that is registered in advance and relates not only to all users who participate in the conference, but also all users who have the authority to use the conference system 100. For example, the information of all employees of the company may be registered in the user information D2. The "user ID" is the identification information of the user, and the "user name" represents the name of the user. The "user ID" and "password" are information used for the login process of the system when a user joins a conference.

For example, a user who participates in a conference starts a conferencing application on his/her own user terminal 2 when starting a conference, and inputs the user ID and the password, which are login information on the login screen. The conference server 1 performs a login process (authentication process) on the basis of the login information. A logged in user is able to participate in conferences using the conferencing application.

FIG. 5 illustrates an example of the conference information D3. The conference information D3 includes information (reservation information) items, such as the corresponding "conference ID," "conference name," "conference room ID," "start date and time," "end date and time," "participant ID," and "file ID" that are registered in association with each other. The "conference ID" is the identification information of the conference, and the "conference name" is the name (item name) of the conference. The "start date and time" represents the scheduled start date and time of the conference, while the "end date and time" represents the scheduled end date and time of the conference. The "participant ID" is identification information (user ID) of a user who participates in the conference. The "file ID" is the identification information of the file (material) used for the conference, and the file data corresponding to the file ID is stored in the storage 12 or a database (not illustrated). The conference information D3 is registered in advance by the person in charge when the schedule for holding the conference is determined.

Some or all of the information such as the conference room information D1, the user information D2, the conference information D3 may be stored in any of the conference server 1, the user terminal 2, and other servers (not illustrated), or may be distributed and stored in these devices.

The controller 11 includes control devices such as a CPU, a ROM, and a RAM. The CPU is a processor that executes various types of arithmetic processing. The ROM stores in advance control programs such as a BIOS and an OS for causing the CPU to execute various types of processing. The RAM stores various types of information, and is used as a temporary storage memory (work area) for the various types of processing that the CPU is to execute. The controller 11 controls the conference server 1 by causing the CPU to execute various types of control programs stored in advance in the ROM or the storage 12.

The controller 11 functions as the various processors by causing the CPU to execute the various types of the processing in accordance with the control programs. Some or all of the processing devices included in the controller 11 may be constructed of an electronic circuit. The control program may be a program that causes the processors to function as the various processing devices.

Specifically, the controller 11 registers the conference room information D1, the user information D2, and the conference information D3. The controller 11 registers in advance each item of information in the storage 12 on the basis of a registration operation by a user. For example, when the user performs an operation to register the user information D2 and the conference information D3 in his/her own user terminal 2, the controller 11 receives the operation and registers the user information D2 and the conference information D3 in the storage 12. When, for example, the manager of the conference room performs an operation to register the conference room information D1 at the his/her own user terminal 2 or the management terminal, the controller 11 receives the operation and registers the conference room information D1 in the storage 12.

The controller 11 executes the login process (authentication process) for users participating in the conference. For example, when a user who participates in a conference inputs the user ID and the password as login information on a login screen, the controller 11 executes a login process by referring to the user information D2 and the conference information D3.

When the conference starts, the controller 11 acquires voice data from the user terminals 2 and outputs the acquired voice data to each of the user terminals 2. For example, when the controller 11 acquires the voice data of a speech voice Va uttered by the user A from the user terminal 2a, the controller 11 outputs the voice data to the user terminals 2c and 2d. For example, when the controller 11 acquires the voice data of a speech voice Vc uttered by the user C from the user terminal 2c, the controller 11 outputs the voice data to the user terminals 2a and 2b.

User Terminal 2

As illustrated in FIG. 2, the user terminal 2 includes a controller 21, a storage 22, the operation display 23, a microphone 24, a speaker 25, and a communicator 26. FIG. 1 illustrates the user terminals 2a and 2b disposed in the conference room R1, and the user terminals 2c and 2d disposed in the conference room R2. The user terminals 2a to 2d have the same functions.

The operation display 23 is a user interface including a display, such as a liquid-crystal display or an organic EL display, that displays various types of information, and an operation section, such as a mouse, a keyboard, or a touch panel that receives operations.

The microphone 24 collects the speech voice of the user of the user terminal 2. The speech voice data (voice data) collected by the microphone 24 is input to the controller 21. The speaker 25 outputs (emits) voice on the basis of a command of controller 21. For example, the speaker 25 outputs the voice of the voice data acquired by the user terminal 2 via the conference server 1 to an external device in accordance with the command of the controller 21.

The communicator 26 is a communication interface for connecting the user terminal 2 to a network N1 by wire or radio and for executing data communications in accordance with a predetermined communication protocol with other devices (e.g., the conference server 1) via the network N1.

The storage 22 is a non-volatile storage, such as a flash memory, an HDD, or an SSD, that stores various types of information. The storage 22 stores control programs, such as a conference program for causing the controller 21 to execute the conference process (see FIG. 10) described below. For example, the conference program may be non-temporarily recorded on a computer-readable recording medium, such as a CD or DVD, and read by a reading device (not illustrated), such as a CD drive or a DVD drive, included in the user terminal 2, so as to be stored in the storage 22.

The controller 21 includes control devices such as a CPU, a ROM, and a RAM. The CPU is a processor that executes various types of arithmetic processing. The ROM stores in advance control programs such as a BIOS and an OS for causing the CPU to execute various types of processing. The RAM stores various types of information, and is used as a temporary storage memory (work area) for the various types of processing that the CPU is to execute. The controller 21 then controls the user terminal 2 by causing the CPU to execute various types of control programs stored in advance in the ROM or the storage 22.

Figure 6:
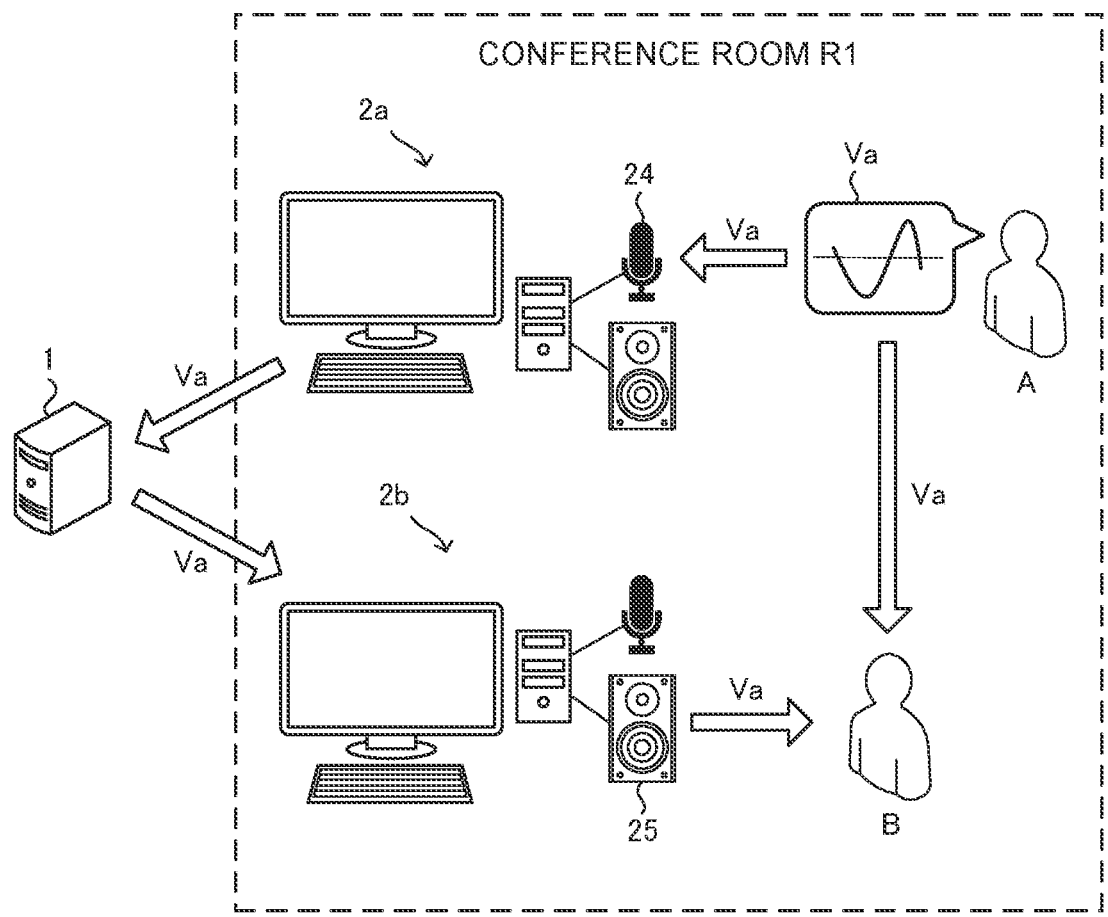
FIG. 6 is a schematic diagram illustrating a voice output method in a conventional conference system.

When users participate in conferences while carrying their own user terminals 2, the following problems may occur. For example, among the users A and B who are in the same conference room R1, when the user A speaks, the user B can directly hear the speech voice Va uttered by the user A, as illustrated in FIG. 6. The user B's user terminal 2b can use a conferencing application to output the user A's speech voice Va collected by the microphone 24 of the user A's user terminal 2a from the speaker 25 of the user terminal 2b via the conference server 1. In such a case, the user B will have a problem of hearing the same voice twice, once directly from the user A and once from the user terminal 2b. In contrast, the conference system 100 according to the present embodiment allows the speech voice of the user to be heard appropriately.

Specifically, as illustrated in FIG. 2, the controller 21 includes various processors such as a voice acquirer 211, a conversation state determiner 212, an output controller 213, and a position acquirer 214. The controller 21 functions as the various processors by causing the CPU to execute the various types of the processing according to the control programs. All or some of the processing units included in the controller 21 may be configured by an electronic circuit. The control program may be a program that causes the processors to function as the various processing devices.

The voice acquirer 211 acquires voice data of the speech voice collected by the microphone 24. For example, when the microphone 24 of the user terminal 2a collects the speech voice Va uttered by the user A, the voice acquirer 211 of the user terminal 2a acquires voice data of the speech voice Va from the microphone 24 of the user terminal 2a. The controller 21 outputs the voice data acquired by the voice acquirer 211 to the conference server 1.

Figure 7:
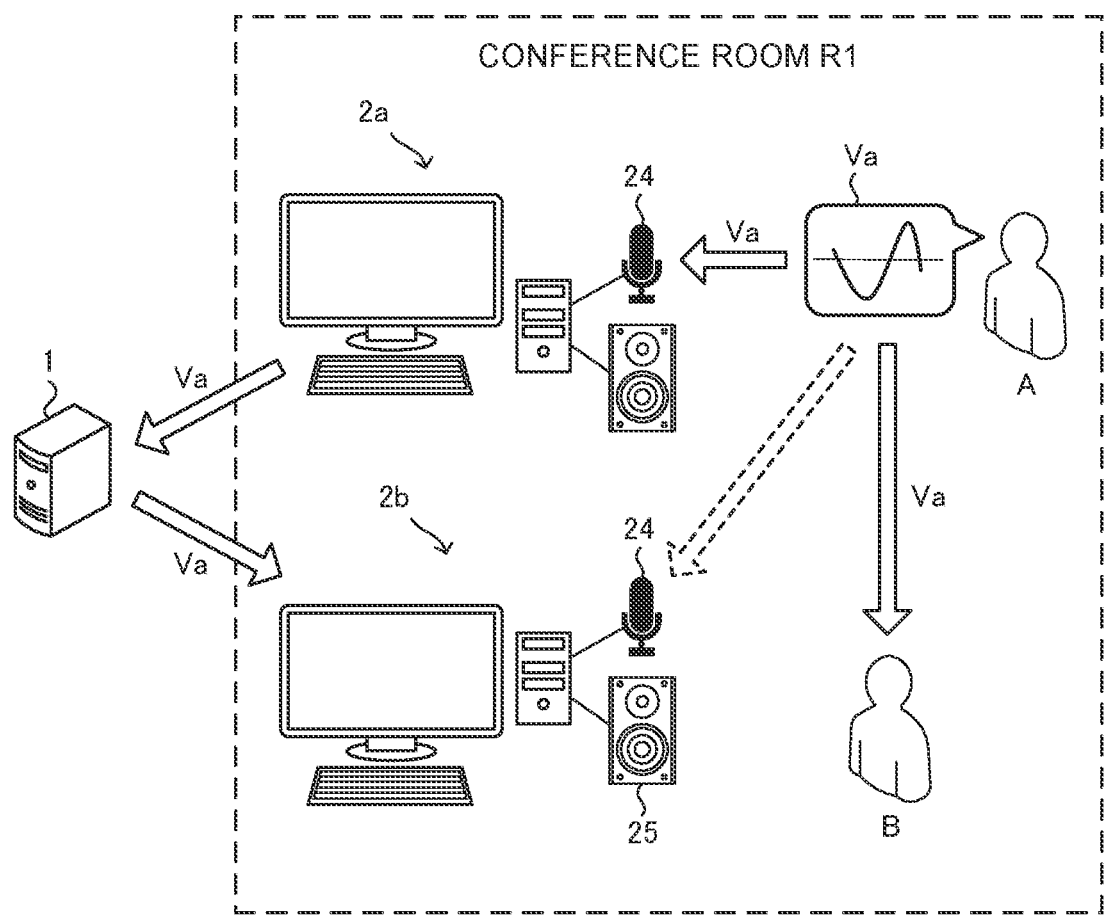
FIG. 7 is a schematic diagram illustrating an example of a voice outputting method in a conference system according to an embodiment of the disclosure.

Here, for example, when user terminal 2b is near the user A, the microphone 24 of the user terminal 2b collects the speech voice Va uttered by the user A, as illustrated in FIG. 7. In such a case, the voice acquirer 211 of the user terminal 2b acquires voice data of the speech voice Va from the microphone 24 of the user terminal 2b. The voice acquirer 211 of the user terminal 2b acquires voice data of the speech voice Va output from the conference server 1 (see FIG. 7).

The conversation state determiner 212 determines whether or not the state of the first and second users is a direct conversation state capable of direct conversation. For example, when the first and second users are in the same conference room and close to each other, direct conversation is possible. In such a case, the first user and second user are in a direct conversation state. The first and second users are, for example, the users A and B in the conference room R1 or the users C and D in the conference room R2.

Specifically, the conversation state determiner 212 of the user terminal 2 of the first user determines whether or not the speech voice of the second user is included in the first acquired voice acquired (collected) by the microphone 24 of the user terminal 2 of the first user. For example, the conversation state determiner 212 of the user terminal 2 of the first user compares the first acquired voice acquired by the microphone 24 of the user terminal 2 of the first user with the second acquired voice acquired by the microphone 24 of the user terminal 2 of the second user, and, on the basis of the comparison result, determines whether or not the first acquired voice includes the speech voice of the second user.

For example, the conversation state determiner 212 of the user terminal 2b compares the voice (first acquired voice) acquired by the microphone 24 of the user terminal 2b with the voice (second acquired voice) acquired by the microphone 24 of the user terminal 2a, and determines that the first acquired voice includes the speech voice of the second user when both voices match.

The conversation state determiner 212 determines that the state of the first and second users is the direct conversation state when it is determined that the speech voice of the second user is included in the first acquired voice. For example, when the conversation state determiner 212 of the user terminal 2b determines that the speech voice Va of the user A is included in the first acquired voice acquired by the microphone 24 of the user terminal 2b, it is determined that the state of the user A and the user B is the direct conversation state.

Similarly, the conversation state determiner 212 of the user terminal 2 of the second user determines whether or not the speech voice of the first user is included in the second acquired voice acquired (collected) by the microphone 24 of the user terminal 2 of the second user. For example, the conversation state determiner 212 of the user terminal 2 of the second user compares the second acquired voice acquired by the microphone 24 of the user terminal 2 of the second user with the first acquired voice acquired by the microphone 24 of the user terminal 2 of the first user, and, on the basis of the comparison result, determines whether or not the second acquired voice includes the speech voice of the first user.

For example, the conversation state determiner 212 of the user terminal 2b compares the voice (second acquired voice) acquired by the microphone 24 of the user terminal 2a with the voice (first acquired voice) acquired by the microphone 24 of the user terminal 2a, and determines that the second acquired voice includes the speech voice of the first user when both voices match.

The conversation state determiner 212 determines that the state of the first and second users is the direct conversation state when it is determined that the speech voice of the first user is included in the second acquired voice. For example, when the conversation state determiner 212 of the user terminal 2a determines that the speech voice Vb of the user B is included in the second acquired voice acquired by the microphone 24 of the user terminal 2a, it is determined that the state of the user A and the user B is the direct conversation state.

Figure 8:
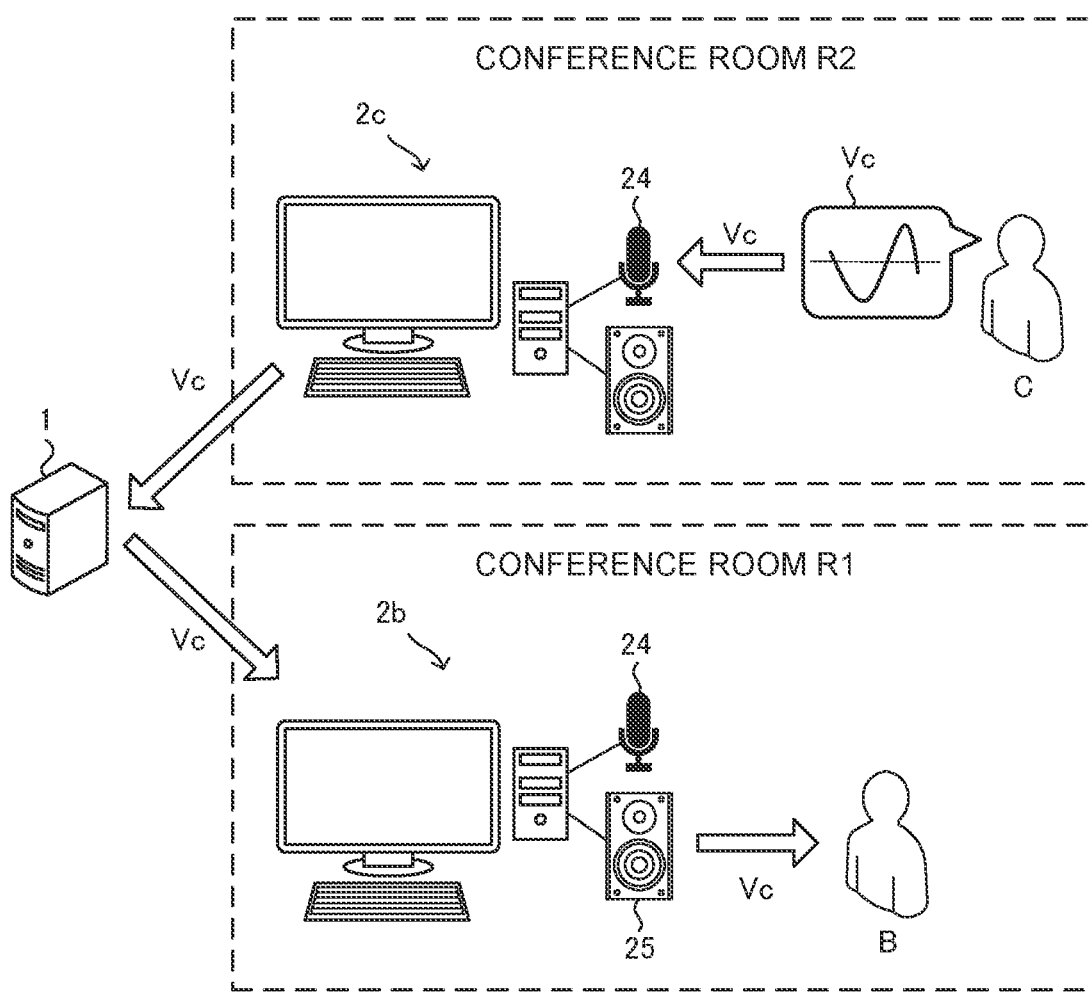
FIG. 8 is a schematic diagram illustrating an example of a voice outputting method in a conference system according to an embodiment of the disclosure.

For example, as illustrated in FIG. 8, the conversation state determiner 212 of the user terminal 2b determines that the speech voice Vc of the user C is not included in the voice acquired by the microphone 24 of the user terminal 2b because the microphone 24 of the user terminal 2b does not acquire the speech voice Vc of the user C. In such a case, the conversation state determiner 212 of the user terminal 2b determines that the state of the users B and C is not the direct conversation state.

The output controller 213 controls whether or not the first acquired voice is to be output from the speaker 25 on the basis of the determination result of the conversation state determiner 212.

Figure 9:
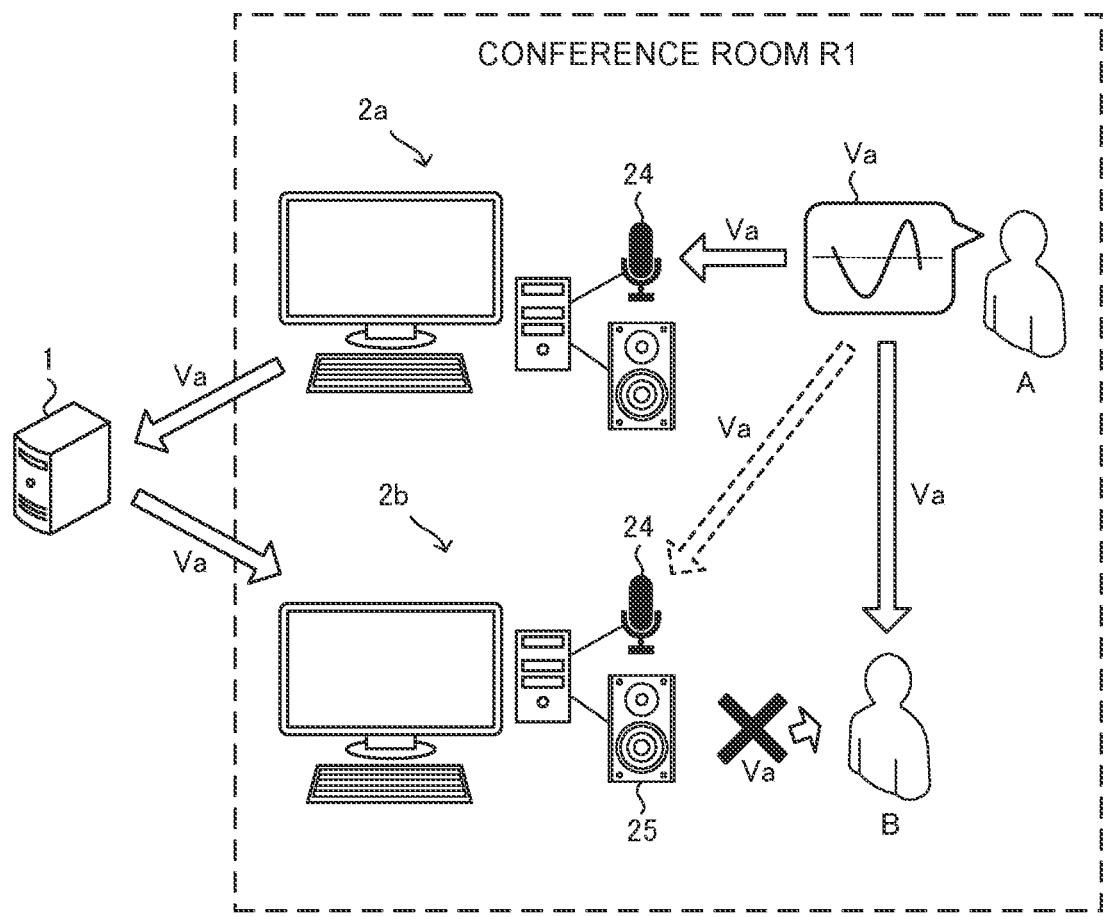
FIG. 9 is a schematic diagram illustrating an example of a voice outputting method in a conference system according to an embodiment of the disclosure.

Specifically, when the conversation state determiner 212 determines that the state of the first and second users is the direct conversation state, the output controller 213 does not output the first acquired voice from the speaker 25. For example, as illustrated in FIG. 9, when the conversation state determiner 212 of the user terminal 2b determines that the state of the users A and B is the direct conversation state, the output controller 213 of the user terminal 2b does not output the speech voice Va of the user A acquired from the conference server 1 from the speaker 25 of the user terminal 2b. For example, the output controller 213 of the user terminal 2b cancels the speech voice Va by superimposing an antiphase voice signal on the voice signal of the speech voice Va of the user A acquired from the conference server 1.

When the conversation state determiner 212 determines that the state of the first and second users is not the direct conversation state, the output controller 213 outputs the first acquired voice from the speaker. For example, as illustrated in FIG. 8, when the conversation state determiner 212 of the user terminal 2b determines that the state of the users B and C is not the direct conversation state, the output controller 213 of the user terminal 2b outputs the speech voice Vc of the user C acquired from the conference server 1 from the speaker 25 of the user terminal 2b.

Similarly, the output controller 213 controls whether or not the second acquired voice is to be output from the speaker 25 on the basis of the determination result of the conversation state determiner 212.

Specifically, when the conversation state determiner 212 determines that the first and second users are in the direct conversation state, the output controller 213 does not output the second acquired voice from the speaker 25. For example, when the conversation state determiner 212 of the user terminal 2a determines that the state of the users A and B is the direct conversation state, the output controller 213 of the user terminal 2a does not output the speech voice Vb of the user B acquired from the conference server 1 from the speaker 25 of the user terminal 2a. For example, the output controller 213 of the user terminal 2a cancels the speech voice Vb by superimposing an antiphase voice signal on the voice signal of the speech voice Vb of the user B acquired from the conference server 1.

When the conversation state determiner 212 determines that the state of the first and second users is not the direct conversation state, the output controller 213 outputs the second acquired voice from the speaker. For example, when the conversation state determiner 212 of the user terminal 2c determines that the state of the users B and C is not the direct conversation state, the output controller 213 of the user terminal 2c outputs the speech voice Vb of the user B acquired from the conference server 1 from the speaker 25 of the user terminal 2c.

Conference Process

An example of a procedure of the conference process executed by the conference system 100 will now be described below with reference to FIG. 10.

The disclosure can be regarded as a disclosure of a conference method (an example of a conference method of the disclosure) in which one or more steps included in the conference process are executed. The one or more steps that are included in the conference process described herein may appropriately be omitted. The execution order of each step in the conference process may be different in a range that achieves the same effect. In the example described here, the controller 21 of the user terminal 2 included in the conference system 100 executes each step in the conference process; however, according to another embodiment, one or more processors may decentrally execute each step in the conference process.

The conference process is executed individually and in parallel in each user terminal 2, for example. Here, the conference process executed by the user terminal 2b of the user B will be described by way of example.

First, in step S1, the controller 21 of the user terminal 2b of the user B determines whether or not the voice has been acquired. For example, the controller 21 of the user terminal 2b acquires the voice of the voice data of the first user output from the conference server 1 and the voice of the second user collected by the microphone 24 of the user terminal 2b.

Next, in step S2, the controller 21 of the user terminal 2b determines whether or not the acquired voice includes the speech voice (microphone voice) of the second user (e.g., user A) acquired by the microphone 24 of the user terminal 2b. If the acquired voice includes the speech voice of the user A ($Y_{es}$ in S2) (see FIG. 7), the process proceeds to step S3. If the acquired voice does not include the speech voice of the user A (No in S2), the process proceeds to step S21.

In step S3, the controller 21 of the user terminal 2b determines that the state of the users A and B is in the direct conversation state. The process then proceeds to Step S4.

In step S4, the controller 21 of the user terminal 2b does not output the speech voice of the user A from the speaker 25 of the user terminal 2b. For example, as illustrated in FIG. 9, when the state of the users A and B is determined to be the direct conversation state, the controller 21 of the user terminal 2b does not output the speech voice Va of the user A acquired from the conference server 1 from the speaker 25 of the user terminal 2b. For example, the controller 21 of the user terminal 2b cancels the speech voice Va by superimposing an antiphase voice signal on the voice signal of the speech voice Va of the user A. The process then returns to step S1.

In contrast, for example, when the voice acquired in step S1 is the voice of the user C (the first user) output from the conference server 1, the controller 21 of the user terminal 2b determines in step S21 that the state of the users B and C is not the direct conversation state. For example, the controller 21 of the user terminal 2b determines that the state of the users B and C is not the direct conversation state when the speech voice Vc of the user C is acquired from the conference server 1. The process then proceeds to Step S22.

In step S22, the controller 21 of the user terminal 2b causes the speaker 25 of the user terminal 2b to output the speech voice Vc of the user C (the first user) acquired from the conference server 1 (see FIG. 8). The process then returns to step S1.

The controller 21 of each user terminal 2 repeatedly executes the conference process.

As described above, the conference system 100 according to the present embodiment is a system in which microphones and speakers are allocated to multiple users including a first user and a second user, and the users conduct a conference by using the microphones and speakers allocated to themselves. In the conference system 100, a first microphone allocated to the first user acquires a first acquired voice and outputs the first acquired voice from a second speaker allocated to the second user, and a second microphone allocated to the second user acquires a second acquired voice and outputs the second acquired voice from a first speaker allocated to the first user. The conference system 100 determines whether or not the state of the first and second users is a direct conversation state in which direct conversation is possible without using the speech system, and controls whether or not to cause the speech system to output the first acquired voice from the second speaker, on the basis of the determination result of the conversation state determiner.

In this way, for example, when the users A and B participate in a conference in the same conference room R1, and the user A makes a speech, the speech voice of the user A is not output from the user terminal 2b, and the user B can directly hear the speech voice of the user A. Thus, the problem of the speech voice of the user A being heard twice can be prevented.

The conference system according to the present disclosure is not limited to the above embodiments. For example, as another embodiment of the disclosure, the conversation state determiner 212 may execute a specific process for identifying the speaker of the speech voice included in the microphone voice acquired by the microphone 24, and may determine whether or not the speech voice of the first user is included in the microphone voice on the basis of the result of the specific process. For example, the conversation state determiner 212 of the user terminal 2b specifies the speaker on the basis of the microphone voice acquired by the microphone 24 of the user terminal 2b. For example, the conversation state determiner 212 identifies the speaker by referring to a database (speaker list) that stores voice identification information for each user. The conversation state determiner 212 of the user terminal 2b determines that the speech voice of the user A is included in the microphone voice when the user A is specified as a speaker of the voice acquired by the microphone 24 of the user terminal 2b. In such a case, the conversation state determiner 212 determines that the state of the users A and B is the direct conversation state.

Similarly, the conversation state determiner 212 of the user terminal 2a specifies the speaker on the basis of the microphone voice acquired by the microphone 24 of the user terminal 2a. The conversation state determiner 212 of the user terminal 2a determines that the speech voice of the user B is included in the microphone voice when the user B is specified as a speaker of the voice acquired by the microphone 24 of the user terminal 2a. In such a case, the conversation state determiner 212 determines that the state of the users A and B is the direct conversation state.

As another embodiment of the disclosure, the controller 21 may include a position acquirer 214 (see FIG. 2) that acquires the position information of the first user and the position information of the second user. In such a case, the conversation state determiner 212 determines that the state of the first and second users is the direct conversation state when the position of the first user and the position of the second user are in a predetermined positional relationship.

For example, the conversation state determiner 212 determines that the state of the first and second users is the direct conversation state when the distance between the position of the first user and the position of the second user is a predetermined distance or less. The conversation state determiner 212 determines that the state of the first and second users is the direct conversation state when the position of the first user and the position of the second user are in a same room (conference room).

In the above-described embodiments, the conference system 100 corresponds to the conference system according to the disclosure, but the conference system according to the disclosure is not limited thereto. For example, the conference system according to the disclosure may include the user terminal 2 alone or the conference server 1 alone, or may include the user terminal 2 and the conference server 1. For example, the conference server 1 may include the functions of the voice acquirer 211, the conversation state determiner 212, the output controller 213, and the position acquirer 214 of the user terminal 2.

The user terminal 2 including the microphone 24, the speaker 25, and the communicator 26, the conference server 1, and the network N1 are examples of the speech system of the disclosure. That is, the speech system of the disclosure includes multiple components for realizing a conversation by transmitting and receiving voice data by using a communication function.

The conference system of the present disclosure can be configured by freely combining each of the embodiments described above within the scope of the disclosure set forth in each claim, or by modifying or partially omitting each of the embodiments as appropriate.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A conference system in which microphones and speakers are allocated to a plurality of users including a first user and a second user, and the users conduct a conference by using the microphones and the speakers allocated to the users, the conference system comprising:

a speech system in which a first microphone allocated to the first user acquires a first acquired voice and outputs the first acquired voice from a second speaker allocated to the second user, and a second microphone allocated to the second user acquires a second acquired voice and outputs the second acquired voice from a first speaker allocated to the first user;

a conversation state determiner that determines whether or not a state of the first user and the second user is a direct conversation state in which direct conversation is possible without using the speech system; and an output controller that controls whether or not to cause the speech system to output the first acquired voice from the second speaker based on a result of the determination of the conversation state determiner, wherein when the first acquired voice matches the second acquired voice, the conversation state determiner determines that the state of the first user and the second user is the direct conversation state, and when the first acquired voice does not match the second acquired voice, the conversation state determiner determines that the state of the first user and the second user is not the direct conversation state, when the conversation state determiner determines that the state of the first user and the second user is the direct conversation state, the output controller does not cause the speech system to output the first acquired voice from the second speaker, and when the conversation state determiner determines that the state of the first user and the second user is not the direct conversation state, the output controller causes the speech system to output the first acquired voice from the second speaker.

2. The conference system according to claim 1, wherein the output controller controls whether or not to cause the speech system to output the second acquired voice from the first speaker, based on a result of the determination of the conversation state determiner.

3. The conference system according to claim 2, wherein, when the conversation state determiner determines that the state of the first user and the second user is the direct conversation state, the output controller does not cause the speech system to output the second acquired voice from the first speaker, and when the conversation state determiner determines that the state of the first user and the second user is not the direct conversation state, the output controller causes the speech system to output the second acquired voice from the first speaker.

4. The conference system according to claim 1, wherein the conversation state determiner determines whether or not the first acquired voice includes a speech voice of the second user, and determines that the state of the first user and the second user is the direct conversation state when the conversation state determiner determines that the first acquired voice includes the speech voice of the second user.

5. The conference system according to claim 4, wherein the conversation state determiner compares the first acquired voice with the second acquired voice, and determines whether or not the first acquired voice includes the speech voice of the second user based on a result of the comparison.

6. The conference system according to claim 4, wherein the conversation state determiner identifies a speaker of a speech voice included in the first acquired voice, and determines whether or not the first acquired voice includes the speech voice of the second user based on a result of the identification.

7. The conference system according to claim 1, wherein the conversation state determiner determines whether or not the second acquired voice includes a speech voice of the first user, and determines that the state of the first user and the second user is the direct conversation state when the conversation state determiner determines that the second acquired voice includes the speech voice of the first user.

8. The conference system according to claim 7, wherein the conversation state determiner compares the first acquired voice with the second acquired voice, and determines whether or not the second acquired voice includes the speech voice of the first user based on a result of the comparison.

9. The conference system according to claim 7, wherein, the conversation state determiner identifies a speaker of a speech voice included in the second acquired voice, and determines whether or not the second acquired voice includes a speech voice of the first user based on a result of the identification.

10. The conference system according to claim 1, further comprising:
a position acquirer that acquires position information of the first user and position information of the second user,
wherein the conversation state determiner determines that the state of the first user and the second user is the direct conversation state when a position of the first user and a position of the second user are in a predetermined positional relationship.

11. The conference system according to claim 10, wherein the conversation state determiner determines that the state of the first user and the second user is the direct conversation state when a distance between the position of the first user and the position of the second user is a predetermined distance or less.

12. The conference system according to claim 10, wherein the conversation state determiner determines that the state of the first user and the second user is the direct conversation state when the position of the first user and the position of the second user are in a same room.

13. A conference method for conducting a conference by allocating microphones and speakers to a plurality of users including a first user and a second user and by allowing the users to use the allocated microphones and speakers, the conference method comprising:
one or more processors executing:
acquiring a first acquired voice by a first microphone allocated to the first user and outputting the first acquired voice from a second speaker allocated to the second user, and acquiring a second acquired voice by a second microphone allocated to the second user and outputting the second acquired voice from a first speaker allocated to the first user;
determining whether or not a state of the first user and the second user is a direct conversation state in which direct conversation is possible; and
controlling whether or not to output the first acquired voice from the second speaker based on a result of the determination, wherein
when the first acquired voice matches the second acquired voice, the state of the first user and the second user is determined to be the direct conversation state, and when the first acquired voice does not match the second acquired voice, the state of the first user and the second user is determined not to be the direct conversation state,
when the state of the first user and the second user is determined to be the direct conversation state, the output controller does not cause the speech system to output the first acquired voice from the second speaker, and
when the state of the first user and the second user is determined not to be the direct conversation state, the output controller causes the speech system to output the first acquired voice from the second speaker.

14. A non-transitory computer-readable recording medium that records a conference program for conducting a conference by allocating microphones and speakers to a plurality of users including a first user and a second user and by allowing the users to use the allocated microphones and speakers, the conference program causing one or more processors to execute:
acquiring a first acquired voice by a first microphone allocated to the first user and outputting the first acquired voice from a second speaker allocated to the second user, and acquiring a second acquired voice by a second microphone allocated to the second user and outputting the second acquired voice from a first speaker allocated to the first user;
determining whether or not a state of the first user and the second user is a direct conversation state in which direct conversation is possible; and
controlling whether or not to output the first acquired voice from the second speaker based on a result of the determination, wherein
when the first acquired voice matches the second acquired voice, the state of the first user and the second user is determined to be the direct conversation state, and when the first acquired voice does not match the second acquired voice, the state of the first user and the second user is determined not to be the direct conversation state,
when the state of the first user and the second user is determined to be the direct conversation state, the output controller does not cause the speech system to output the first acquired voice from the second speaker, and
when the state of the first user and the second user is determined not to be the direct conversation state, the output controller causes the speech system to output the first acquired voice from the second speaker.

* * * * *